United States Patent Office 3,036,058
Patented May 22, 1962

3,036,058
NEW AZO DYESTUFFS
Herbert Francis Andrew and Alec Mee, Manchester, England, assignors to Imperial Chemical Industries Limited, London, England, a corporation of Great Britain
No Drawing. Filed Sept. 21, 1959, Ser. No. 841,017
Claims priority, application Great Britain Sept. 29, 1958
5 Claims. (Cl. 260—146)

This invention relates to new azo dyestuffs and more particularly it relates to new water-soluble disazo dyestuffs which are valuable for the colouration of cellulose textile materials.

According to the invention there are provided the new disazo dyestuffs which, in the form of the free acids, are represented by the formula:

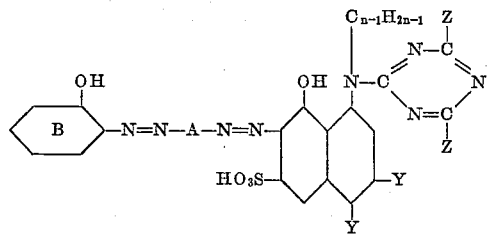

wherein A stands for a radical selected from the class consisting of phenylene and naphthylene radicals, Z stands for an atom selected from the class consisting of a chlorine and a bromine atom, $n$ stands for an integer up to 5, one Y is a hydrogen atom and the other Y is selected from a hydrogen atom and a sulpho group and the benzene ring B contains up to two groups selected from the class consisting of nitro and sulpho groups.

When $n$ in the $C_{n-1}H_{2n-1}$ group represents 2, 3, 4 or 5 then the $C_{n-1}H_{2n-1}$ group represents a methyl, ethyl, propyl or butyl radical but it is preferred that $n$ represents 1 in which case the $C_{n-1}H_{2n-1}$ group represents a hydrogen atom.

The new disazo dyestuffs may be obtained by condensing cyanuric chloride or cyanuric bromide with an aminodisazo compound which, in the form of its free acid, is represented by the formula:

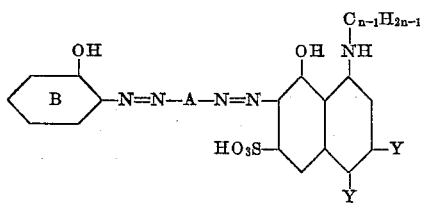

wherein A, B, Y and $n$ have the meanings stated above.

The condensation may be carried out by adding an aqueous solution of the aminodisazo compound to a suspension of cyanuric chloride or cyanuric bromide in water, preferably at a temperature of between 0° and 5° C. adding sodium carbonate to maintain the pH of the mixture between 6.0 and 7.2, and filtering off the disazo dyestuff which is formed. If desired sodium chloride may be added to ensure complete precipitation of all the disazo dyestuff.

The aminodisazo compounds may themselves be obtained by diazotising a 2-aminophenol containing one or two nitro and/or sulphonic acid groups, coupling the diazo compound so obtained with a para-coupling amine of the benzene or naphthalene series, diazotising the aminoazo compound so obtained and coupling with an aminonapthol sulphonic acid of the formula:

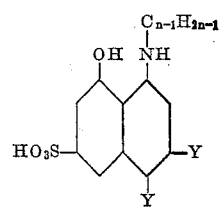

wherein Y and $n$ have the meanings stated above.

As examples of the 2-aminophenols containing one or two nitro and/or sulphonic acid groups which can be used to obtain the aminodisazo compounds there may be mentioned 2-aminophenol-4-sulphonic acid, 2-aminophenol-4:6-disulphonic acid, 4:66-dinitro-2-aminophenol and 4-nitro-2-aminophenol-6-sulphonic acid.

The para coupling amines of the benzene or naphthalene series used to obtain the aminodisazo compounds may contain substituents such as lower alkyl and lower alkoxy radicals and sulphonic acid groups, but it is found that the presence or absence of such groups has little or no effect on the properties of the resulting dyestuffs. As examples of such para coupling amines of the benzene and naphthalene series there may be mentioned cresidine, 2:5-dimethoxyaniline, 1-naphthylamine-6- or 7-sulphonic acid and 2-methoxy-1-naphthylamine-6-sulphonic acid.

As examples of the aminonaphthol sulphonic acids which can be used to obtain the aminodisazo compounds there may be mentioned 1-amino-8-naphthol-6-sulphonic acid, 1-amino-8-naphthol-3:6- or 4:6-disulphonic acid, 1-N-methylamino-8-naphthol-3:6- or 4:6-disulphonic acid, 1-N-butylamino-8-naphthol-3:6- or 4:6-disulphonic acid and 1-N-ethylamino-8-naphthylamine-6-sulphonic acid.

A preferred class of the new disazo dyestuffs are those dyestuffs wherein the phenylene or naphthylene radical represented by A contains one or two hydroxy groups, each of which is situated in an ortho position to an azo group, since the preferred class of the dyestuffs yields copper complexes which have excellent fastness to light.

According to a further feature of the invention there are provided the copper complexes of the disazo dyestuffs which, in the form of the free acids, are represented by the formula:

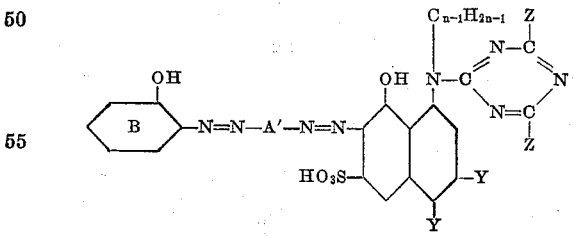

wherein B, Y, Z and $n$ have the meanings stated and A' stands for a radical selected from the class consisting of phenylene and naphthylene radicals which radical contains up to two —OH groups each of which is situated in an ortho position to an azo group.

The copper complexes of the disazo dyestuffs may be obtained by reacting a metallisable disazo compound of the formula:

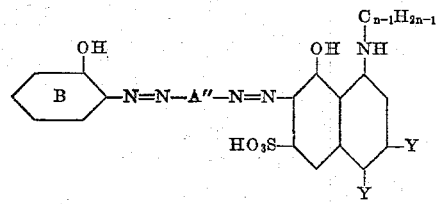

wherein B, Y and $n$ have the meanings stated above and A″ stands for a radical selected from the class consisting of phenylene and naphthylene radicals which radical contains up to two —OR groups each of which is situated in an ortho position to an azo group, wherein R is selected from a hydrogen and a lower alkyl radical, preferably a methyl radical, with an agent yielding copper and with cyanuric chloride or with cyanuric bromide.

The reaction between the metallisable disazo compound and the cyanuric chloride or cyanuric bromide may be carried out before the treatment with the agent yielding copper or the metallisable disazo compound may be reacted with the agent yielding copper and the copper derivative subsequently treated with cyanuric chloride or with cyanuric bromide.

The metallisable disazo compounds may be converted to the copper complexes by known methods, for example by heating an aqueous solution of the agent yielding copper and the copper complex of the disazo compound so obtained may be isolated by adding sodium chloride and filtering off the precipitated metallised azo compound. The subsequent treatment with the cyanuric chloride or cyanuric bromide may be carried out by adding an aqueous solution of the copper complex of the disazo compound to an aqueous suspension of cyanuric chloride or cyanuric bromide, preferably at a temperature of between 0° and 5° C. adding sodium carbonate to maintain the pH of the mixture between 6 and 7.2, and filtering off the metallized azo dyestuff which is formed. If desired sodium chloride may be added to ensure complete precipitation of all the metallised azo dyestuff.

As examples of agents yielding copper which can be used to obtain the copper complexes of the disazo dyestuffs there may be mentioned copper acetate, copper sulphate and cuprammonium sulphate.

The metallisable disazo compounds of the above formula may themselves be obtained by diazotising a 2-aminophenol containing one or two nitro and/or sulphonic acid groups, coupling the diazo compound so obtained with a para-coupling amine of the benzene or naphthalene series which contains 1 or 2 —OR groups, as hereinbefore defined, one of which is in an ortho position to the amino group and/or the other is in an ortho position to the coupling position, diazotising the aminoazo compound so obtained and coupling with an aminonaphthol sulphonic acid, as hereinbefore defined.

As examples of the para-coupling amines of the benzene or naphthalene series containing 1 or 2 —OR groups there may be mentioned cresidine, 2:5-dimethoxyaniline and 2-methoxy-1-naphthylamine-6-sulphonic acid.

It is preferred to isolate the new disazo dyestuffs and the new copper complexes of the disazo dyestuffs, as hereinbefore defined, from the media in which they have been formed at a pH from 6 to 8 and it has been found that the loss of halogen from the triazine ring or rings present in the dyestuffs can be reduced considerably by addition of buffering agents which give a pH value between 6 and 8 and in particular by those which give a pH of about 6.5. As examples of such buffering agents there may be mentioned mixtures of disodium hydrogen phosphate and sodium dihydrogen phosphate, mixtures of disodium hydrogen phosphate and potassium dihydrogen phosphate and mixtures of sodium diethylmetanilate and sodium hydrogen sulphate. The buffering agents may be added at any time during the manufacture of the said disazo dyestuffs but it is preferred to add the buffering agents to the reaction mixture prior to the isolation of the dyestuff and to subsequently mix the dyestuff paste with more of the buffering agent before drying the dyestuff paste, which is preferably carried out at a temperature below 65° C. The dried dyestuff compositions so obtained are frequently more stable than the unbuffered dried dyestuffs.

The new disazo dyestuffs and the copper complexes of the disazodyestuffs, as hereinbefore defined, in the form of their alkali metal salts, are readily soluble in water. They are especially valuable for the colouration of cellulose textile materials in conjunction with a treatment with an acid-binding agent, for example by the process described in British specification No. 797,946, wherein the dyestuffs are applied to a cellulose textile material and the so-coloured textile material is after-treated with an acid-binding agent. Alternatively the acid-binding agent may be applied to the textile material before or during the application of the dyestuff.

The new disazo dyestuffs and the copper complexes of the disazo dyestuffs, as hereinbefore defined, when so applied to cellulose textile materials give shades which are very fast to wet treatments such as washing and to light, and the coloured cellulose textile materials so obtained do not suffer from bleeding when the coloured textile materials are stored in a humid atmosphere particularly in the presence of acid fumes.

The invention is illustrated but not limited by the following examples in which the parts and percentages are by weight:

Example 1

Diazotised 2-aminophenol-4:6-disulphonic acid is coupled with one molecular proportion of 2:5-dimethoxyaniline and the aminoazo compound so obtained is then diazotised and coupled with one molecular proportion of 1-amino-8-naphthol-3:6-disulphonic acid in the presence of sodium carbonate.

9.5 parts of cyanuric chloride are dissolved in 100 parts of acetone and the solution is poured into a stirred mixture of 100 parts of water and 200 parts of ice. A solution of 42.75 parts of the tetrasodium salt of the above aminodisazo dyestuff in 400 parts of water is then added during 45 minutes to the suspension of cyanuric chloride, the temperature being maintained below 50° C. by the addition of ice. The mixture is stirred for a further hour, then neutralised to pH 6.8 by the addition of 50 parts of a 2 N aqueous solution of sodium carbonate. 9 parts of sodium diethylmetanilate and 1 part of sodium hydrogen sulphate are then added and the precipitated dyestuff is filtered off and washed with 400 parts of acetone. The product on the filter is then mixed with 1.8 parts of sodium diethylmetanilate and 0.2 part of sodium hydrogen sulphate and dried at 20° C.

The dyestuff composition so obtained contains 2.0 atoms of organically bound chlorine for each disazo molecule present. When applied to cellulose textile materials in conjunction with a treatment with an acid-binding agent the dyestuff gives blue shades possessing good fastness to washing and to light.

Example 2

In place of the 9.5 parts of cyanuric chloride used in Example 1 there are used 16 parts of cyanuric bromide whereby a dyestuff is obtained having similar properties to the dyestuff of Example 1.

The following table gives further examples of the dyestuffs of the invention which are obtained by replacing the 42.75 parts of the tetrasodium salt of the aminodisazo compound used in Example 1 by an equivalent amount of the sodium salt of the aminodisazo compound which is obtained by diazotising an aminophenol listed in the second column of the table, coupling with the amine listed in the third column of the table, rediazotising and coupling with the aminonaphthol sulphonic acid listed in the fourth column of the table. The fifth column of the table indicates the shades of the colourations produced on cellulose textile materials from the said dyestuffs.

| Example | Aminophenol | Amine | Aminonaphthol sulphonic acid | Shade obtained on cellulose textile materials |
|---|---|---|---|---|
| 3 | 2-aminophenol-4-sulphonic acid. | 2:5-dimethoxyaniline. | 1-amino-8-naphthol-3:6-disulphonic acid. | Blue. |
| 4 | ----do---- | 1-naphthylamine-6-sulphonic acid. | ----do---- | Reddish-blue. |
| 5 | 2-aminophenol-4:6-disulphonic acid. | 2:5-dimethoxyaniline. | 1-N-butylamino-8-naphthol-3:6-disulphonic acid. | Do. |
| 6 | 2-amino-4:6-dinitrophenol. | 2-methoxy-1-naphthylamine-6-sulphonic acid. | 1-amino-8-naphthol-3:6-disulphonic acid. | Blue. |
| 7 | ----do---- | 1-naphthylamine-6-sulphonic acid. | ----do---- | Greenish-blue. |
| 8 | ----do---- | cresidine. | ----do---- | Blue. |
| 9 | 6-nitro-2-aminophenol-4-sulphonic acid. | 2:5-dimethoxyaniline. | ----do---- | Do. |
| 10 | 2-aminophenol-4:6-disulphonic acid. | ----do---- | 1-amino-8-naphthol-4:6-disulphonic acid. | Do. |
| 11 | ----do---- | ----do---- | 1-amino-8-naphthol-6-sulphonic acid. | Reddish-blue. |

Example 12

Diazotised 2-aminophenol-4:6-disulphonic acid is coupled with 2:5-dimethoxyaniline, the aminomonoazo compound so obtained is diazotised and coupled with an equimolecular proportion of 1-amino-8-naphthol-3:6-disulphonic acid under alkaline conditions, and the aminodisazo compound is heated with an aqueous solution of cuprammonium sulphate to yield the copper complex.

3.8 parts of cyanuric chloride are dissolved in 50 parts of acetone and the solution is poured into a stirred mixture of 50 parts of water and 100 parts of ice. A solution of 18.7 parts of the tetra-sodium salts of the above copper complex in 250 parts of water is then added during 20 minutes to the suspension of cyanuric chloride, the temperature being maintained below 5° C. by the addition of ice. The mixture is stirred for a further hour, then neutralised to pH 6.8 by the addition of 15 parts of a 2 N aqueous solution of sodium carbonate. 9 parts of sodium diethylmetanilate and 1 part of sodium hydrogen sulphate are then added and the precipitated dyestuff is filtered off. The residue on the filter is washed with 200 parts of acetone, and the product on the filter is mixed with 0.9 part of sodium diethylmetanilate and 0.1 part of sodium hydrogen sulphate and dried at 20° C.

The dyestuff composition so obtained contains 1.9 atoms of organically bound chlorine for each disazo molecule present. When applied to cellulose textile materials in conjunction with a treatment with an acid-binding agent the dyestuff gives grey shades possessing excellent fastness to washing and to light.

Example 13

In place of the 18.7 parts of the tetrasodium salt of the copper complex used in Example 12 there are used 16.5 parts of the disodium salt of the copper complex obtained by coupling diazotised 4:6-dinitro-2-aminophenol with 2:5 - dimethoxyaniline, rediazotising, coupling with 1-amino-8-naphthol-3:6-disulphonic acid under alkaline conditions and subsequently heating with an aqueous solution of cuprammonium sulphate.

The dyestuff so obtained, when applied to cellulose textile materials in conjunction with a treatment with an acid-binding agent, yields reddish-blue shades possessing excellent fastness to wet treatments and to light.

Example 14

In place of the 18.7 parts of the tetrasodium salt of the copper complex used in Example 12 there are used 17.5 parts of the trisodium salt of the copper complex obtained by coupling diazotised 2-aminophenol-4-sulphonic acid with 2:5-dimethoxy-aniline, heating with an aqueous solution of cuprammonium sulphate, rediazotising the copper compound so obtained and coupling with 1-N-butylamino-8-naphthol-3:6-disulphonic acid under alkaline conditions.

The dyestuff so obtained, when applied to cellulose textile materials in conjunction with a treatment with an acid-binding agent, yields reddish-blue shades possessing excellent fastness to wet treatments and to light.

When the 1-N-butylamino-8-naphthol-3:6-disulphonic acid used in the above example is replaced by an equivalent amount of 1-amino-8-naphthol-3:6-disulphonic acid or of 1-amino-8-naphthol-4:6-disulphonic acid dyestuffs are obtained which yield bluish-grey colourations when applied to cellulose textile materials in conjunction with a treatment with an acid-binding agent.

What we claim is:

1. The disazo dyestuffs which, in the form of the free acids, are represented by the formula:

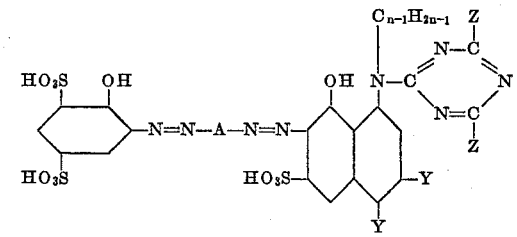

wherein A stands for a radical selected from the class consisting of 1:4-phenylene and 1:4-naphthylene radicals, Z stands for an atom selected from the class consisting of a chlorine and a bromine atom, $n$ stands for an integer up to 5 and one Y is hydrogen and the other Y is selected from the class consisting of a hydrogen atom and a sulpho group.

2. The disazo dyestuffs which, in the form of the free acids, are represented by the formula:

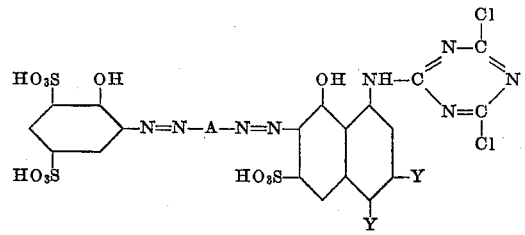

wherein A stands for a radical selected from the class consisting of 1:4-phenylene and 1:4-naphthylene radicals and one Y is hydrogen and the other Y is selected from the class consisting of a hydrogen atom and a sulpho group.

3. The disazo dyestuff which, in the form of the free acid, is represented by the formula:

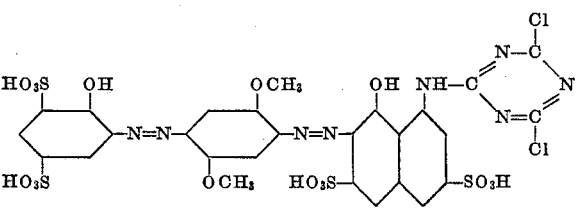

4. The copper complexes of the disazo dyestuffs, which, in the form of the free acids, are represented by the formula:

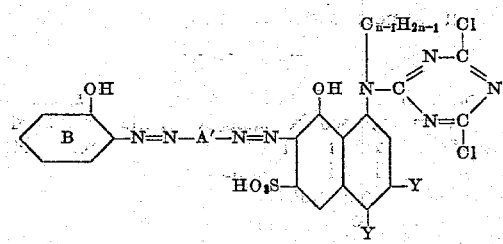

wherein A' stands for a radical selected from the class consisting of 1:4-phenylene and 1:4-naphthylene radicals which radical contains up to two —OH groups each of which is situated in an ortho position to an azo group, $n$ stands for an integer up to 5, one Y is a hydrogen atom and the other Y is selected from the class consisting of a hydrogen atom and a sulpho group and the benzene ring B contains up to two groups selected from the class consisting of nitro and sulpho groups.

5. The copper complexes of the disazo dyestuffs which, in the form of the free acids, are represented by the formula:

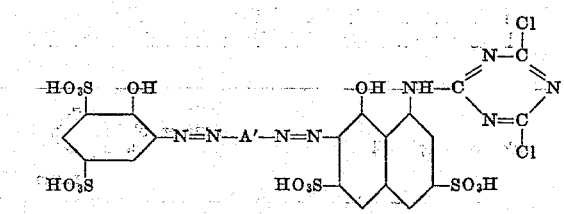

wherein A' stands for a radical selected from the class consisting of 1:4-phenylene and 1:4-naphthylene radicals which radical contains up to two —OH groups each of which is situated in an ortho position to an azo group.

References Cited in the file of this patent

UNITED STATES PATENTS

| | | |
|---|---|---|
| 1,667,312 | Fritzsche et al. | Apr. 24, 1928 |
| 1,901,278 | Baddiley et al. | Mar. 14, 1933 |
| 2,041,829 | Gyr et al | May 26, 1936 |
| 2,860,128 | Gunst | Nov. 11, 1958 |